(12) United States Patent
Rogozinski et al.

(10) Patent No.: US 10,692,286 B2
(45) Date of Patent: Jun. 23, 2020

(54) DEVICE AND METHOD OF CREATING AN AUGMENTED INTERACTIVE VIRTUAL REALITY SYSTEM

(71) Applicant: VR Drive Sp. z O.O., Lodz (PL)

(72) Inventors: Arkadiusz Rogozinski, Lodz (PL); Radoslaw Gezella, Lodz (PL); Pawel Tryzno, Lodz (PL)

(*) Notice: Subject to any disclaimer, the term of this patent is extended or adjusted under 35 U.S.C. 154(b) by 380 days.

(21) Appl. No.: 15/068,555

(22) Filed: Mar. 12, 2016

(65) Prior Publication Data

US 2017/0064296 A1   Mar. 2, 2017

Related U.S. Application Data

(60) Provisional application No. 62/211,516, filed on Aug. 28, 2015.

(51) Int. Cl.
| | | |
|---|---|---|
| *G06K 9/00* | (2006.01) |
| *G06T 7/579* | (2017.01) |
| *G06K 9/62* | (2006.01) |
| *G06K 9/46* | (2006.01) |
| *G06T 19/00* | (2011.01) |

(52) U.S. Cl.
CPC ........ *G06T 19/006* (2013.01); *G06K 9/00718* (2013.01); *G06K 9/6253* (2013.01); *G06T 7/579* (2017.01); *G06K 9/4604* (2013.01); *G06T 2207/20104* (2013.01)

(58) Field of Classification Search
CPC ............ G06K 9/00718; G06K 9/4604; G06K 9/6253; G06T 19/006; G06T 2207/20104; G06T 7/579
See application file for complete search history.

(56) References Cited

U.S. PATENT DOCUMENTS

| | | | | |
|---|---|---|---|---|
| 6,028,608 A | * | 2/2000 | Jenkins ................. | G06T 1/0021 345/619 |
| 6,088,040 A | * | 7/2000 | Oda ........................ | G06T 13/80 345/441 |
| 6,111,582 A | * | 8/2000 | Jenkins ................... | G06T 15/40 345/421 |
| 2004/0085443 A1 | * | 5/2004 | Kallioniemi ............. | G01N 1/36 348/135 |
| 2009/0016599 A1 | * | 1/2009 | Eaton ................. | G06K 9/00335 382/159 |
| 2010/0007665 A1 | * | 1/2010 | Smith ..................... | G06T 13/40 345/473 |

* cited by examiner

*Primary Examiner* — Clifford Hilaire
(74) *Attorney, Agent, or Firm* — Cherskov Flaynik & Gurda, LLC

(57) ABSTRACT

A system for detecting and incorporating three-dimensional objects into a video stream reads an input video data stream. The user specifies areas of attention wherein said areas of attention or hotspots. Tracking movement of the hotspots generating a trajectory of said at least one object. Generating a cloud of points and tracking said points to detect configurations of points most similar to the initially defined hotspot. Obtaining a three dimensional topology defining a volume of interest in a three-dimensional space. Building virtual structures or pseudo objects that are placed within a spherical environment generated on the input video.

20 Claims, 12 Drawing Sheets

DEVICE AND METHOD OF CREATING AN AUGMENTED INTERACTIVE VIRTUAL REALITY SYSTEM

PRIORITY CLAIM

The instant application claims priority as a non-provisional of U.S. Provisional Application Ser. No. 62/211,516 filed on Aug. 28, 2015, presently pending, the contents of which are incorporated herein by reference.

BACKGROUND OF THE INVENTION

1. Field of the Invention

The field of the invention is generation and display of three-dimensional data, specifically processing of videos and images to generate three-dimensional presentations, especially in a 360-degree environment.

2. Background of the Invention

In various embodiments, the invention allows for automated generation of three dimensional data from a video stream, using topographic information or independently of information outside of the video stream.

In one embodiment, the invention is used to generate three dimensional renditions from standard video recordings. The invented system allows end users to identify objects of interest, measures their movement, and extrapolates their motion in three dimensions on basis of recorded two-dimensional movement.

Traditional video recordings capture a projection of real-world objects having three dimensions onto a two dimensional screen. While depth information is preserved in some instances, the three-dimensional nature of the captured subject matter is lost. For example, when objects move in or out of a frame, information about their features is not stored. In one embodiment, the system models objects shown in the video as true three dimensional objects by extrapolating their features. The fully modeled objects can therefore be interacted with, and metadata or other information may be stored with the object. When a three-dimensional object moves off the screen, information about the part of the object is not lost. Further, modeled objects that become obscured by a passing element are maintained in the system as independent objects.

A need exists in the art for a system and method of adding three dimensional data and features to video input by identifying objects of interest and modeling the objects. Using current state of the art techniques, attempting to create a complete three dimensional model of every rigid and non-rigid body within the view of the camera would result in unmanageable amounts of data and would require excessive computing power. As described below, in one embodiment, the system includes a method of specifying objects of interest, obtaining three-dimensional data of same, and integrating the data into the video stream to output a version of the video stream including three-dimensional interactive objects.

SUMMARY OF INVENTION

An object of the invention is to create interactive multi-dimensional videos. A feature of the invention is that it converts two-dimensional video streams to ones having additional data, including depth information, in one embodiment. An advantage of the invention is that it accepts many types of input to create interactive three-dimensional output.

Another object of the invention is to facilitate the identification of objects of interest whose features are to be modeled fully. A feature of the invention is that the end user of the system can identify which objects are to be modeled and which objects are to be disregarded in the analysis. An advantage of the invention is that it allows for selective generation of three-dimensional data without incurring the computational and storage costs of converting all video to three dimensional data.

Yet another object of the invention is that it accepts video streams and topographical information. A feature of the invention is that topographical information about the scene may be integrated into the processing steps. An advantage of the system is that it can accommodate and synchronize many types of input to create a realistic three-dimensional rendering of subject matter.

A further object of the invention is to effectively detect movement of objects of interest within a video stream. A feature of the invention is that it calculates the movement of several objects to extrapolate their three-dimensional features. An advantage of the system is that it can convert two-dimensional video into one that includes defined three-dimensional objects on basis of movement of defined objects.

Another object of the invention is to use common steps regardless of the type of input provided to the system. A feature of the invention is that it uses similar processing steps whether spatial data is included as input or is extrapolated from other sources. A benefit of the invention is that it does not require spatial data as input, but can rely on alternative work flows.

An additional object of the invention is to identify objects to be modeled onto three-dimensional space. A feature of the invention is that it can determine locations of objects to be modeled within a three-dimensional space of a video stream. A benefit of the system is that it models starting locations and movement of objects within the system.

A further object of the invention is to optimally detect objects and their movements with as few computing resources as possible. A feature of the system is that it identifies objects of interest and does not attempt to model unnecessary objects within the field of view of the camera. A benefit of the system is that it efficiently defines and models objects.

An additional object of the invention is to associate multimedia data with modeled objects. A feature of the invention is that the objects modeled can include information along with the actual modeled object. A benefit of the invention is that the objects (which can be three-dimensional bodies, two-dimensional shapes, and points) can be used to convey additional information in the form of video and sound.

A further object of the invention is to provide a user with an easy to use graphical interface to interact with the environment. A feature of the invention is that the user interacts with the objects in a flexible and natural manner. A benefit of the invention is that it provides the user with information in a manner that exceeds the capabilities of real-world experiences.

An additional object of the invention is the projection of objects and three-dimensional data onto an environment which surrounds a user's vision. A feature of the invention is that in one embodiment, the modeled objects are projected onto a sphere which surrounds the user's vision. A benefit of the invention is that it results in a three-dimensional environment which allows the user to interact with while donning a headset or other video surround interface.

A further object of the invention is to present the end user with an augmented view of the environment. A feature of the invention is that the system accepts as input a view of the physical world and adds additional information to same, such as interactive objects. A benefit of the invention is that it results in a familiar environment for the user that nonetheless conveys additional information and otherwise provides an augmented reality.

A system for detecting and incorporating three-dimensional data into a video stream comprising: reading an input video data stream; specifying areas of attention wherein said areas of attention comprise hotspots defining at least one object of interest shown within the video data stream; tracking movement of said hotspots generating a trajectory of said at least one object of interest; generating a cloud of points and tracking said points to detect configurations of points most similar to the initially defined hotspot; obtaining a three dimensional topology defining a volume of interest in a three-dimensional space; compiling the hot spots to an intermediate format; building virtual structures to relate said hot spots to said three dimensional topology to create a three dimensional geometric shape; and projecting resulting said shape on a sphere.

BRIEF DESCRIPTION OF DRAWING

The invention together with the above and other objects and advantages will be best understood from the following detailed description of the preferred embodiment of the invention shown in the accompanying drawings, wherein.

DETAILED DESCRIPTION OF THE INVENTION

Figure 1:
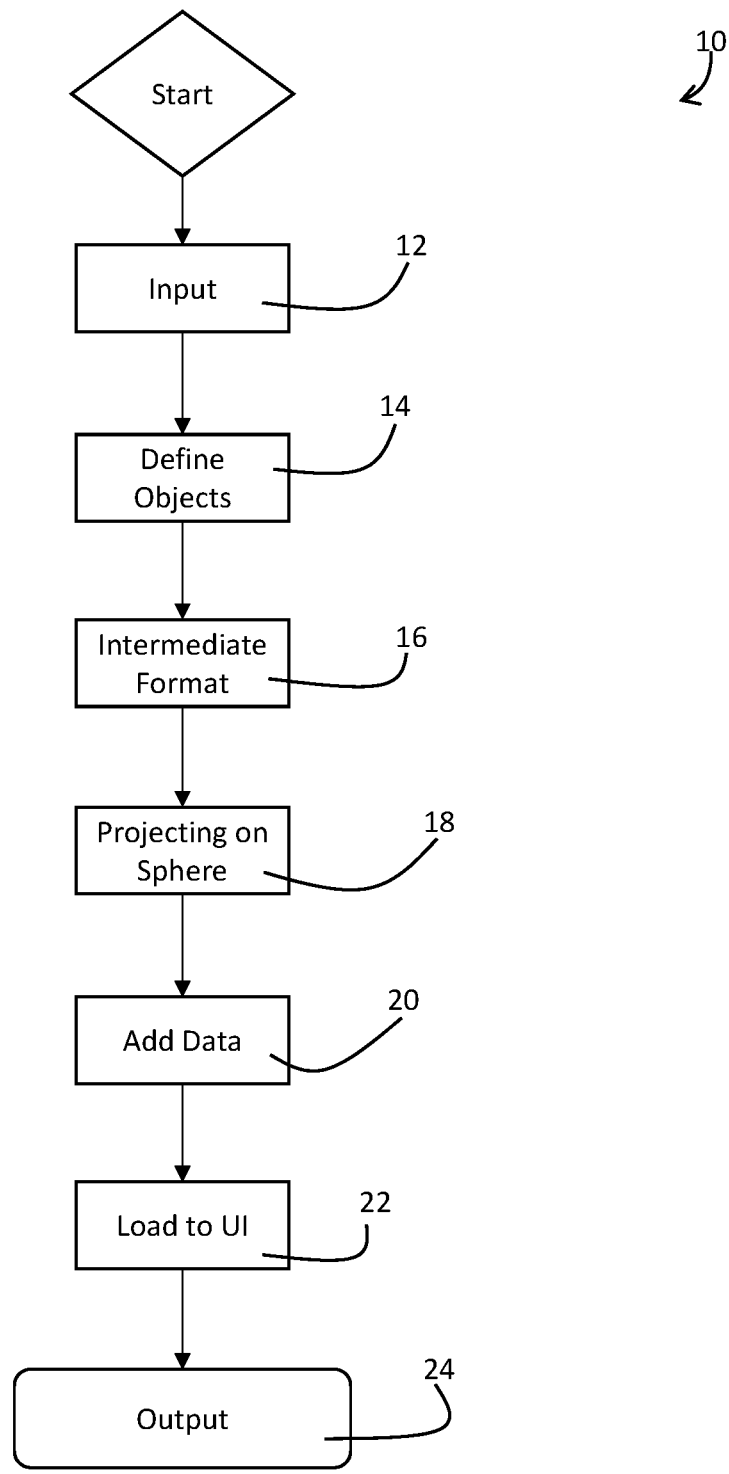
FIG. 1 depicts an overview of the process involved in generating three-dimensional video pursuant to one embodiment of the invention.

The foregoing summary, as well as the following detailed description of certain embodiments of the present invention, will be better understood when read in conjunction with the appended drawings.

To the extent that the figures illustrate diagrams of the functional blocks of various embodiments, the functional blocks are not necessarily indicative of the division between hardware circuitry. Thus, for example, one or more of the functional blocks (e.g. processors or memories) may be implemented in a single piece of hardware (e.g. a general purpose signal processor or a block of random access memory, hard disk or the like). Similarly, the programs may be stand-alone programs, may be incorporated as subroutines in an operating system, may be functions in an installed software package, and the like. It should be understood that the various embodiments are not limited to the arrangements and instrumentality shown in the drawings.

As used herein, an element or step recited in the singular and proceeded with the word "a" or "an" should be understood as not excluding plural said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

Turning to the figures, FIG. 1 depicts an overview of the process 10. While as depicted in FIG. 1, the process is shown as a linear combination of steps, many of the tasks involved in the process 10 can be performed concurrently, including using several computing resources, both local to the end user of the process 10 and remote from the end user.

Pursuant to the embodiment shown as process 10, the process 10 begins with the provision of input 12. In the embodiment shown, the input 12 comprises video data, such as a digital video stream. The process 10 accepts as input any digital video, but also a digitalization of an analog video stream, including ones of lower resolution and lower frame rate. The system accepts as input both interlaced and non-interlaced video formats, and can accept any encoding of video, such as different encodings using the H.264, MPEG-4, and others. There is no upper or lower limit on the resolution and other properties of the video input.

In one embodiment, the input 12 comprises only a video signal, in other embodiments, the input 12 includes three-dimensional spatial data as well as the video signal. The alternative embodiments are described in detail in conjunction with remaining figures described below.

The input 12 comprises video representation of physical objects and the physical world. The purpose of the process 10 is to introduce three-dimensional information to the two-dimensional video input 12. As such, the video input 12 should depict discernable objects, as opposed to purely abstract environments. In one embodiment the video input 12 depicts an interior of a building, in another embodiment the input 12 comprises a recording of a video concert, and in another embodiment the input 12 comprises a video of commercial premises. Finally, in another embodiment, the input 12 comprises a video of a simulated environment, such as a scene created featuring computer-generated imagery (CGI), however, the CGI scene nonetheless includes discernable objects that require modeling and identification. In one embodiment, the discernable objects comprise physical-world objects.

In one embodiment, the video input 12 is provided to a multi-purpose computing storage device, such as a hard drive connected to a multi-purpose computer on which the process 10 is operating. In another embodiment, the video input 12 is uploaded to a multi-user computing device which hosts the process 10, as would be the case in a cloud computing setting.

Upon the conclusion of providing the process 10 with the input 12, the end user defines 14 one or more objects to be modeled by the process 10. As discussed below, the user may also define points of interest, areas of interest, and volumes of interest. In one embodiment, the end user can view the video and manually select which objects are to be modeled by the process 10. In another embodiment, the process 10 assists the user in identifying the objects to be defined 14 by identifying movement, performing edge detection on the video stream, and other methods. The ability of the user to define 14 objects of interest limits the complexity of the system, which does not need to model the entire video as three-dimensional data, as attempting to model the entire video as three-dimensional data is cost-prohibitive given current computational complexity approaches.

The system then analyzes the input 12 and the object definitions 14 to arrive at an intermediate format 16. The calculation of the intermediate format 16 is described in detail below. The intermediate format 16 comprises defined objects 14 and their movement within the video stream provided as input 12 as well as any spatial data synchronized with the video input 12.

The intermediate format 16 comprises objects as defined 14 by the user and system previously, their spatial locations within the video stream 12, and movement of the objects within the video stream 12. In one embodiment, the intermediate format 16 comprises binary data, in another embodiment, the intermediate format 16 comprises XML data. In other embodiments, the intermediate format 16 comprises a data format which is suitable for review by an end user or system designer, for debugging and other purposes.

Upon generation of the intermediate format 16, the process 10 proceeds to the projection of the video, the defined objects 14, and the information contained in the intermediate format 16 onto a sphere 18, in one embodiment. This surround projection 18 results in an interactive environment that can be interacted with by the user in a surround-projection environment, such as a headset. The user is able to turn their head and view different sections of the projection 18, just as the user could do in the physical world. The projection 18 includes the defined objects 14 which the user may interact with at the conclusion of the process 10.

The process 10 also adds information other than spatial information found in the intermediate format 16 about the defined objects 14. While as shown in FIG. 1, the adding of data step 20 occurs after projection step 18, the adding of data 20 can occur at any time after the objects are defined 14. The additional data 20 can include information such as metadata, or exhibit information where the defined object 14 comprises an object in a virtual version of a museum. The additional data is not necessary to model the object in a three-dimensional environment, and so is optional. However, the process 10 facilitates the addition of any type of metadata, including hyperlinks, graphical and video information, text, as well as the ability to take action in regards to the defined object 14. For example, in one embodiment, one of the actions possible to be undertaken in regards to an object 14 is to pick up the object 14, rotate it, and view it more closely.

The additional data 20 is synchronized with the defined objects 14 and the inputs 12 to create a seamless environment for the end user.

Upon the acceptance of the additional data 20, the process 10 loads the information to a user interface 22. In one embodiment, the user interface 20 is a graphical user interface allowing the user to enter commands to interact with the defined objects 14. In another embodiment, the user interface 22 relies predominantly on voice commands, received by a microphone. In another embodiment, the user interface 22 includes a pointer rendered within the system and the end-user controls the pointer by using a touchpad or similar device. In another embodiment, the user interface 22 is actuated by the use of input from a hardware input device.

In one embodiment, this hardware input device comprises an eye-tracking device. In another embodiment, the input is a hand-tracking device. In a further embodiment, the input is a brain-wave detection headset. In other embodiments, the input is handled by hardware input/out devices.

Finally, after the information is loaded to the user interface 22, the system is output to the end user 24. The user can then interact with the surround projection 18 and defined objects 14 by using the user interface 22.

In one embodiment, the loading of the output 24 is a singular event, such as by uploading the information to a headset worn by the end user. In another embodiment, the steps 12-22 are performed iteratively as the user interacts with the environment, by defining objects 14 in one part of the simulation while the user interacts with a different part of the simulation.

In one embodiment, the end user of the process 10 is the same person who provides the input 12 and defines the objects of interest 14. In another embodiment, a different individual or multiple individuals interact with the earlier stages of the process 10 before the final product (or useable portions thereof) are uploaded in the output step 24.

In one embodiment, the end user is asked to provide one or more credentials to the process 10 as part of the output consumption step 24. In this embodiment, different interactive objects are available to the user, depending on their identity. For example, when interacting with museum exhibits different students may be assigned to interact with different sections of the museum. In these embodiments, the additional data 20 will include permissions for objects. Furthermore, different defined objects 14 have different available actions or additional data, depending on the identity of the user viewing the output 24. In this embodiment, a user may only choose to purchase a virtual object if the end user's account status contains sufficient credits to purchase the object (either in the virtual world or in the physical world in embodiments where the virtual representation corresponds to physical objects).

Video Based Object Identification

Figure 2:
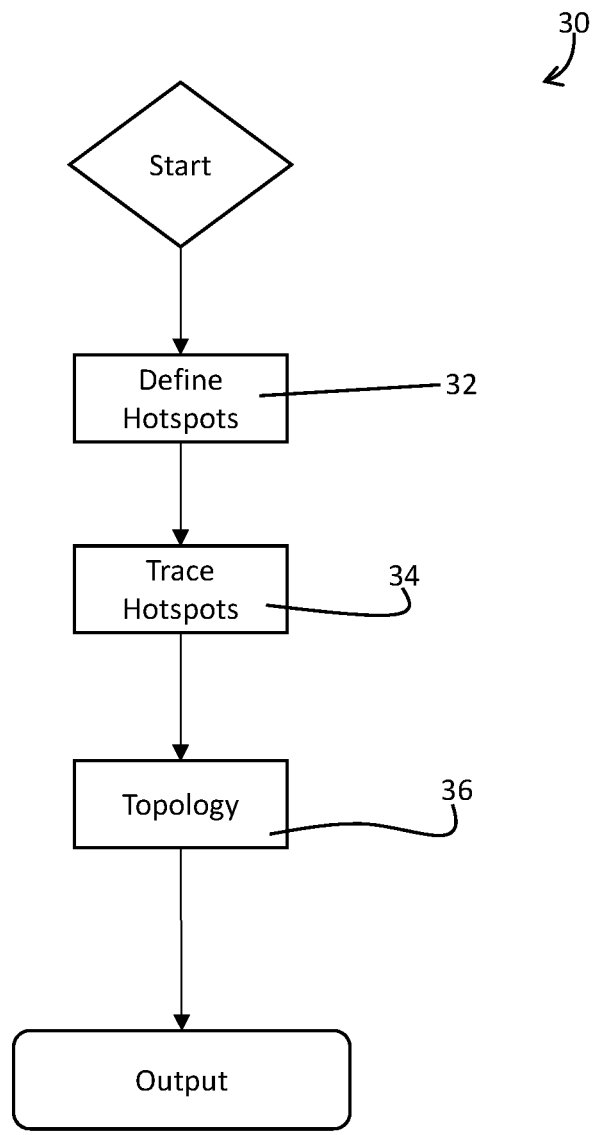
FIG. 2 depicts a flow chart of the processing steps of one embodiment of the invention.

Turning to FIG. 2 depicted there is an overview of the process of defining and identifying objects, pursuant to one embodiment. In this embodiment, objects are identified based on the video provided as input.

The process of video-based object identification 30 requires as input only a video stream. The process 30 begins with the definition of hotspots 32. In one embodiment, the hotspots are defined as any point within the area or center of objects of interest in the video input. In another embodiment, the point or points which are temporarily located beyond the frame of the video input are tracked in relationship to the object or objects, and a value representing their location in reference to the points is maintained.

In one embodiment, the process 30 suggests to the end user some potential hotspots prior to the definition step 32. In another embodiment, the process 30 requires the end user to first identify some objects within the video of interest, before generating the hotspot groups.

An object is generally defined as a group of points in space 32 such that the object can be differentiated from other world objects and the background. The precise number of hotspots required depends on the number of potential objects within the video frame, and the degree to which the objects overlap, in one embodiment. In this embodiment, the number of hotspots correlates to the number of interactive objects within the system. In other embodiments, the number of points in space 32 per object is a function of several factors, such as size of object, the speed of movement of the object within consecutive frames, and others.

Once the user selects hotspots 32, either with or without the system's help, the system attempts to detect objects shown within the video that the hotspots 32 identify. In one embodiment, the system requires feedback from the user to identify objects, especially in video streams where there is an insufficient contrast between the objects and the background. In another embodiment, the process 30 is interactive, and asks the user to confirm the identified initial hotspots before moving forward with the process. In yet another embodiment, the system uses machine learning from previous video analysis to determine which objects are likely to be of interest, and which objects have been selected by the end user. In another embodiment, the system bypasses the user selection of hotspots 32 step. Instead, the system identifies objects within the video autonomously without user input.

The definition of hotspots occurs while the input video is paused in a single frame, in one embodiment, or only a few frames in another embodiment. Upon the definition of hotspots 32, the process 30 moves to the trace hotspots 34 step where the originally defined hotspots are followed in subsequent frames of the video to detect movement of the objects defined 32 by the hotspots. The tracing step 34 analyzes multiple subsequent frames of the video concurrently.

In one embodiment, for digitally encoded videos, the system does not rely on decoded video streams, but instead also uses the encoded video. An encoded video stream comprises only anchor frames and motion vectors to represent movement between the anchor frames. As such, the process 30 can detect the motion of the hotspots within the encoded video stream by referring to the encoded video. However, where the encoded video is not suitable, the system can use the standard 20 frame per second video stream.

During the trace step 34, the process 30 generates the motion of each hotspot or group of hotspots defined in step 32. Part of the tracing step 34 is a determination of which hotspots have moved out of the frame, and which ones have returned. The tracing step 34 results in the process 30 understanding the motion of the objects, at least in two-dimensional space represented by the video frames. In one embodiment, part of the trace step 34 is to generate pseudo-topological information for each object. In this embodiment, photogrammetric methods are used to generate positions of surface points on frame and extrapolate their topological information. In this embodiment, the sole input is the video stream, but the resulting modelled environment includes relative locations of identified objects within the video stream.

To incorporate three dimensional information into the defined objects, the system relies on receiving topology information in a subsequent step 36. In one embodiment, the topology information is extrapolated based on movement of the hotspots and on basis of input from the user. For example, the user can indicate that all objects are about equidistant from the camera, and that one of the objects has a particular size. On the basis of this information, the system can extrapolate the dimensions of all objects within the frame, without being provided the actual dimensions of every object.

The topology information 36 step can also provide information about the background features of the video. As such, even if motion of a particular background element is not traced in step 34, its physical size and features can still be used as part of the topology step 36.

The output of this video-based object identification process 30 is the intermediate format 16 as shown in FIG. 1.

Topological Information Object Identification

Figure 3:
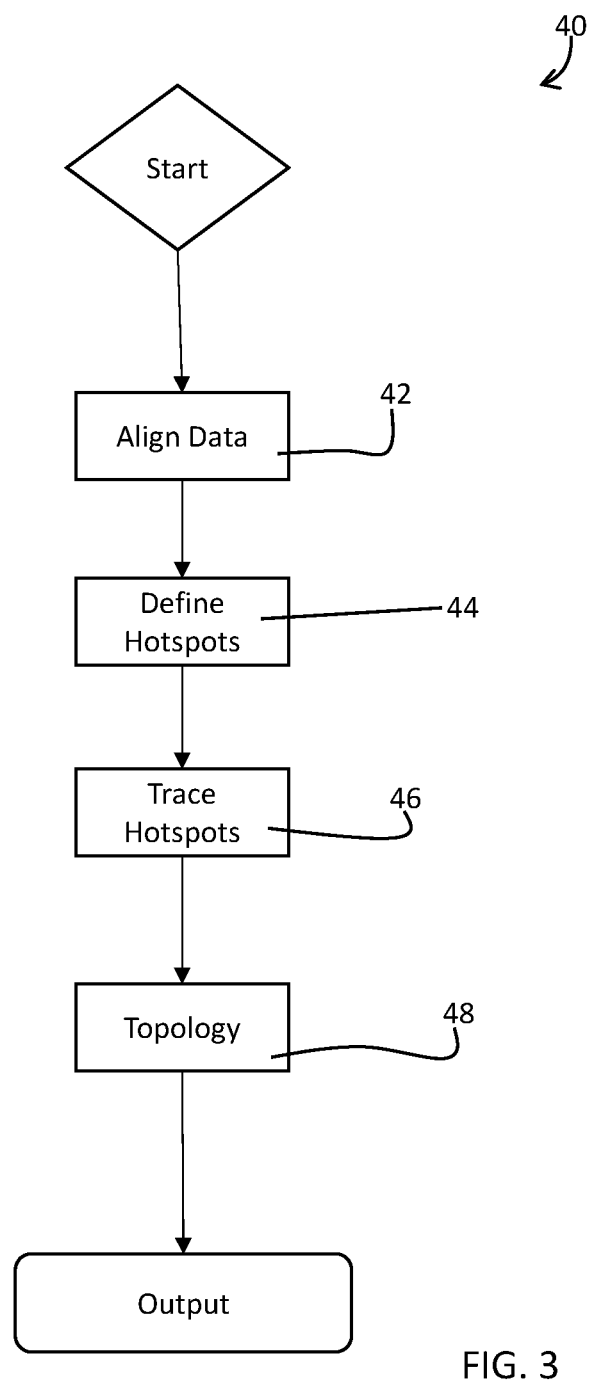
FIG. 3 depicts a flow chart of the processing steps of another embodiment of the invention.

An alternative object identification process 40 is depicted in FIG. 3. In this process 40, the input 12 includes not only a video stream 12 but also direct measurements of topology, such as from lidar measurements, GPS measurements, and other physical readings of the environment. In one embodiment, the additional topology measurements are taken using a depth camera or cameras setup.

The measurements based process 40 requires the topological information to be normalized and aligned with the input video stream. The alignment step 42, attempts to identify boundaries within the initial video frames to determine where topological features exist within the input video. In instances where the process 40 is not able to identify depth changes or where its identification is not assigned a high certainty value, the process 40 requests confirmation from the end user. However, once the data is aligned, the system does not require further confirmation unless the system encounters anomalies in the subsequent video streams, such as extremely fast motion, obscured objects, unexpected disappearances and appearances of objects (as may happen if the video includes bright flashes of light that the camera was not able to compensate for).

As was the case with the video based process of FIG. 2, the measurements based process 40 requires an identification and definition of hotspots 44. The hotspots define objects both in the video stream, but also in the aligned spatial data 42 associated with the video stream.

Following the definition of the hotspots, the process 40 continues on to the review of the remaining input, including video and any other topographical information. The tracing step 46 in this method results in tracing the motion of hotspots in relation to the camera.

The process 40 also includes providing of topology information 48. For objects whose motion was measured directly by the aligned spatial data 42, little additional work has to be performed, with the exception of extrapolating movement information in time intervals where aligned topological information is not available. While a video frame is provided for every 50 milliseconds, readings from the spatial data source may be far less frequent. In one embodiment, the topological information is provided only once for the video stream. In another embodiment, the topological information is provided at regular intervals, but still not twenty times per second.

The output of the process 40 is the same intermediate format as was output by the video based process 30, in one embodiment.

Object Projection

Figure 4:
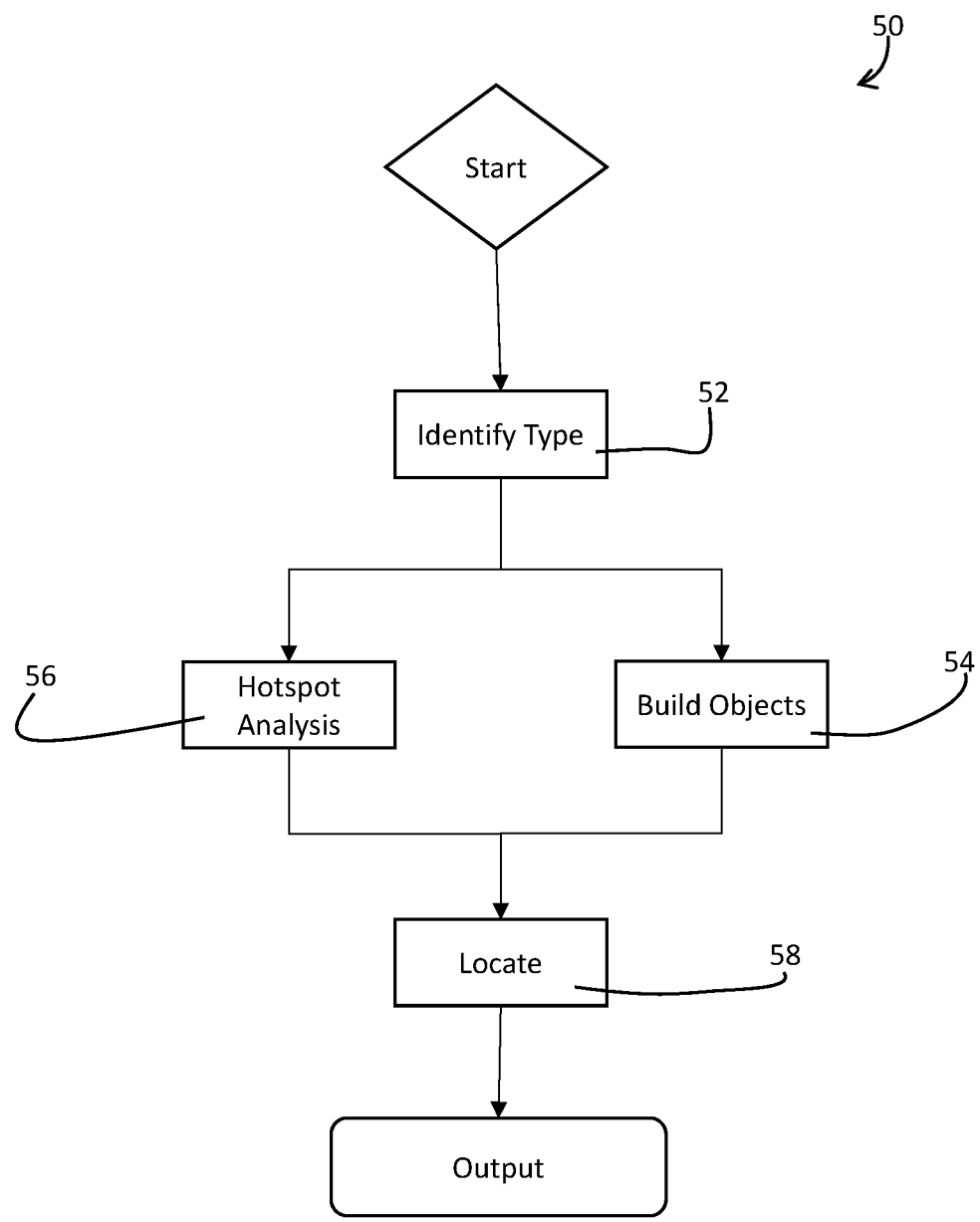
FIG. 4 depicts a flow chart of the projection steps of one embodiment of the invention.

The detailed steps required to ready the intermediate format data into data that can be projected onto a sphere is shown in FIG. 4.

The data process 50 begins with identifying the source data type 52. If the source of the intermediate data was the video based process 30 then the intermediate data is processed by focusing on the hotspot activity. If instead, the intermediate data was created using the measurement based object identification process 40 then the data process 50 follows the object building path. In one embodiment, the type identification occurs as a separate process, in another, the system 50 is provided with a value to indicate which type of input data was available. In yet another embodiment, the identification step 52 ensures that the spatial data relied upon by the measurement-based process 40 is sufficiently detailed and of sufficient quality to allow the system to proceed using the build objects path, and not simply checking the type of data that was provided to the system.

If the type identification step 52 indicates that topographical information is available and was of high quality, the system proceeds to build three-dimensional objects 54 of the data. The objects comprise structures, planes, and angles representing the identified objects of interest. The process 50 identifies regions of interest, points of interest, and volumes of interest within the video stream, converting the intermediate data into information about actual objects in the video stream. The objects identified within the video stream 54 are also projected within a three-dimensional space, both in terms of one another (if there are multiple objects within a frame) and in relationship to the background imagery.

However, if the type identification step 52 determines that only pseudo-objects will be defined due to a lack of topological information, the system instead relies on hotspot activity to create planes, and motion vertexes to correspond to the hotspots defined in the intermediate data.

Groups of points are defined on basis of common movement, and user preferences for identified objects within the data. A group of points defining a fully modeled object or partially modeled pseudo-object may have a hotspot associated with same.

Regardless of whether actual objects are defined or only pseudo-objects using hotspot data, the information is located during the subsequent location step 58. Part of this step is the determination of the distance of each object/pseudo object to the user.

The output of the process 50 is a set of objects (defined by hotspot groups in one embodiment) and their physical location in relationship to one another and the background. The output of this process 50 is used to project the objects onto a sphere which the end-user will eventually interact with.

In one embodiment, the video output is always a 360-degree environment where objects of interest are added and displayed.

Sample Output

Figure 5A:
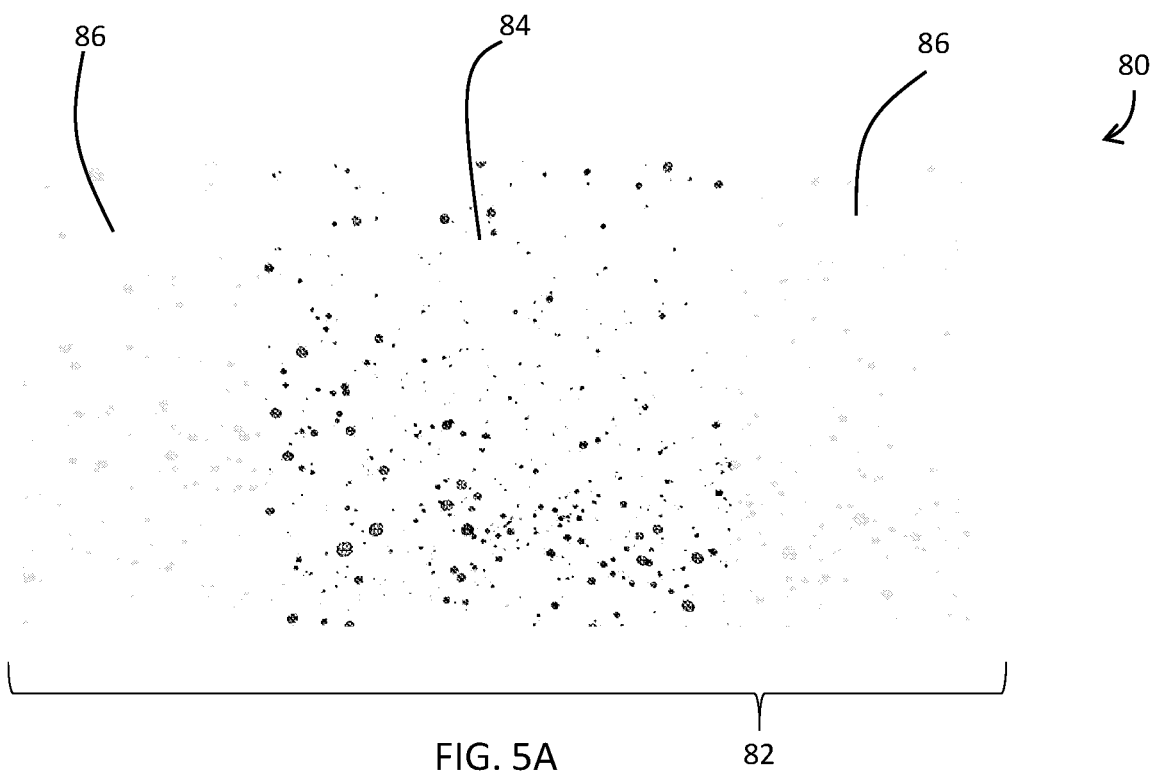
FIGS. 5A-D depict sample video frames showing processing steps pursuant to an embodiment of the invention.

A sample output of the system is shown in FIGS. 5A-D. As shown in FIG. 5A, the sample video 80 comprises a video stream showing a night sky featuring a star pattern.

While the output of the system is a surrounding presentation, the sample shown in FIGS. 5A-D is a projection of that presentation for ease of illustration.

As shown in FIG. 5A, the video has been converted into a surrounding presentation 82, where only a portion is visible 84 at any one time. This visible portion 84 is what faces the user. Given that human field of view is roughly 180 degrees, the visible portion 84 is approximately ½ of the total surrounding presentation. As shown in FIG. 5A, the left and right sections of the surrounding presentation 82 are the obscured portions 86.

Figure 5B:
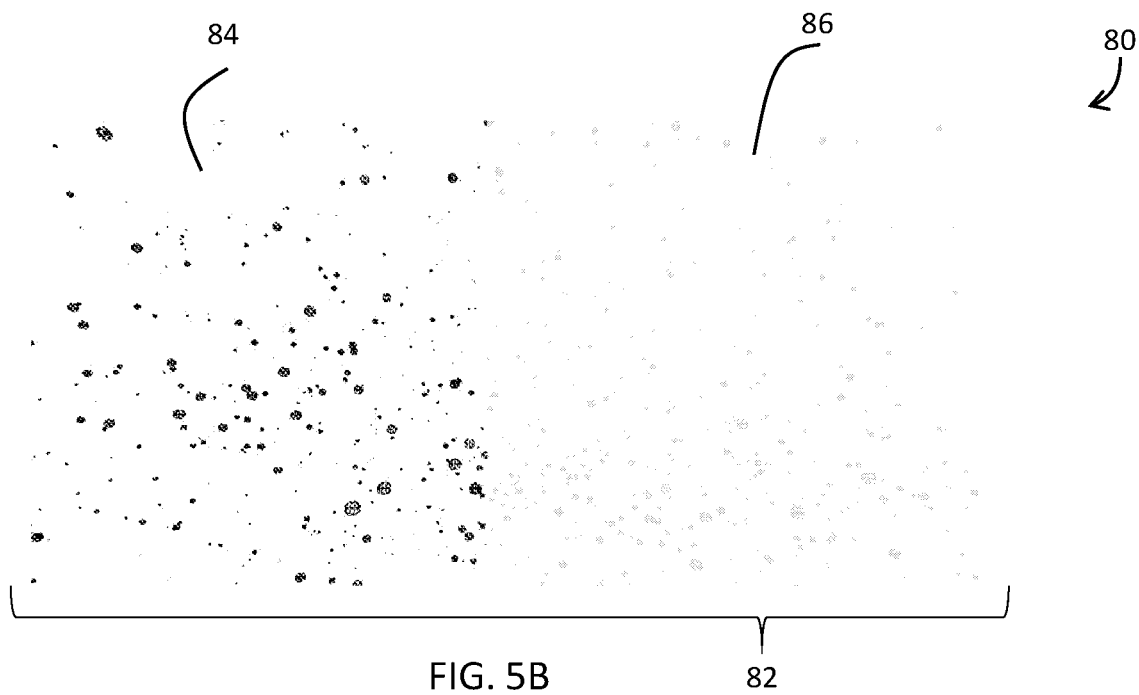

As shown in FIG. 5B, the user has shifted the visible portion 84 to the left, by for example moving their head or moving their eyes, or other indication to the system that the visible segment should move. While the visible portion 84 shown between FIGS. 5A and 5B is a sudden jump, the motion of the visible portion 84 would be a smooth transition, in one embodiment of the invention. In FIG. 5B, the obscured portion is essentially the right ½ of the surrounding presentation 82.

Figure 5C:
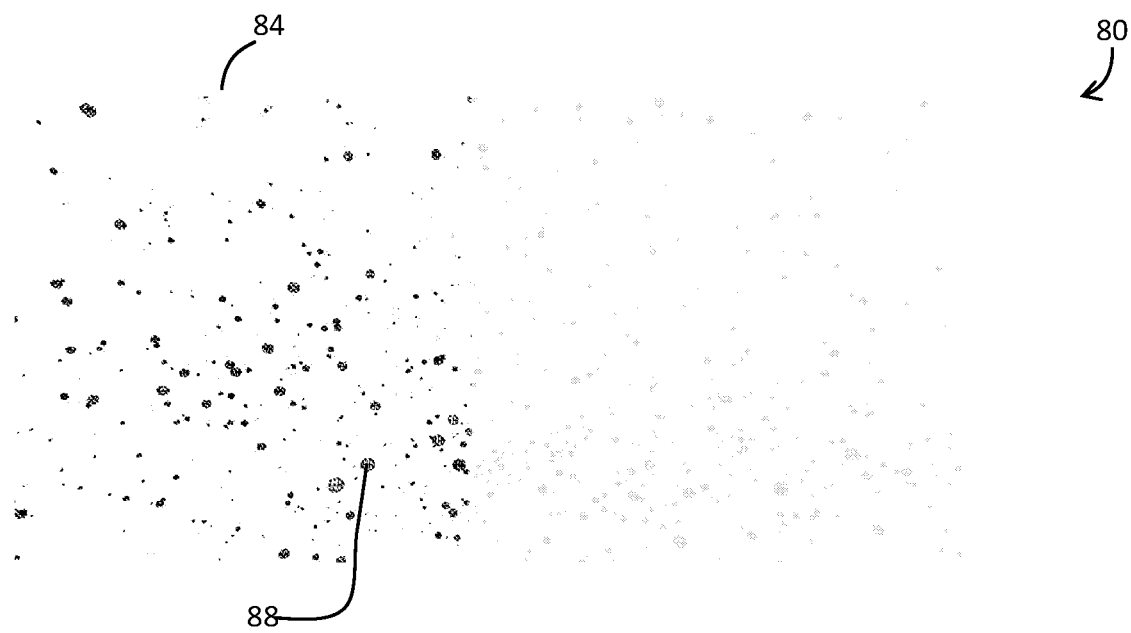

As shown in FIG. 5C, the visible segment 84 includes a defined object 88. The defined object 88 comprises a star within the visible segment 84 for which additional information has been provided and which has been designated as one that is to be modeled as a three dimensional object. As the defined object 88 is fully modeled, the user can move it closer, zoom in on it, view the details of the object, and so forth.

Figure 5D:
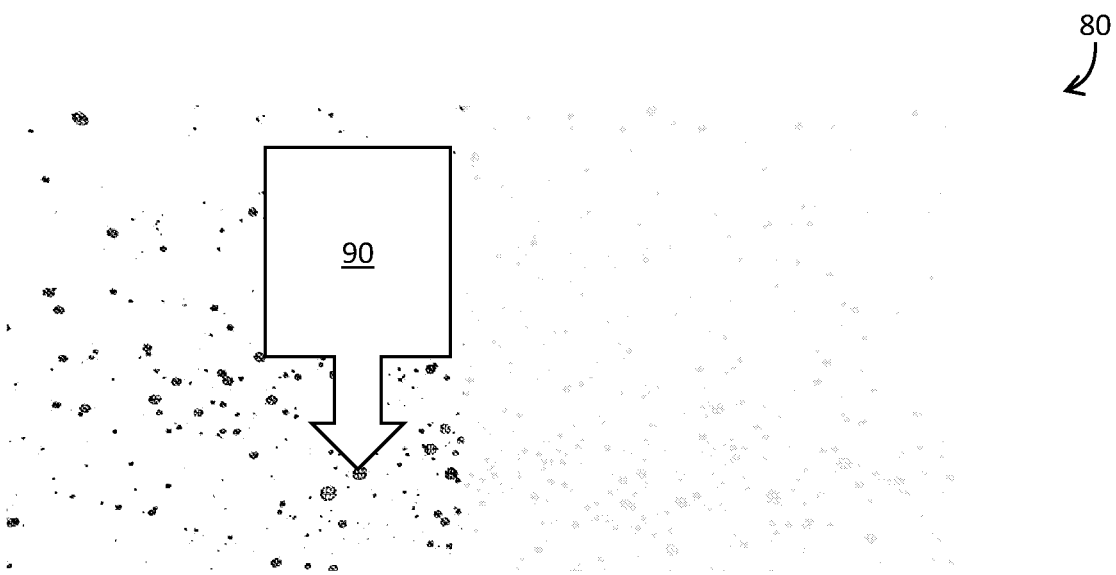

Further, as shown in FIG. 5D, the object also has associated metadata 90. The user can invoke the metadata by triggering an appropriate option from within the user interface.

Example User Interface

Figure 6:
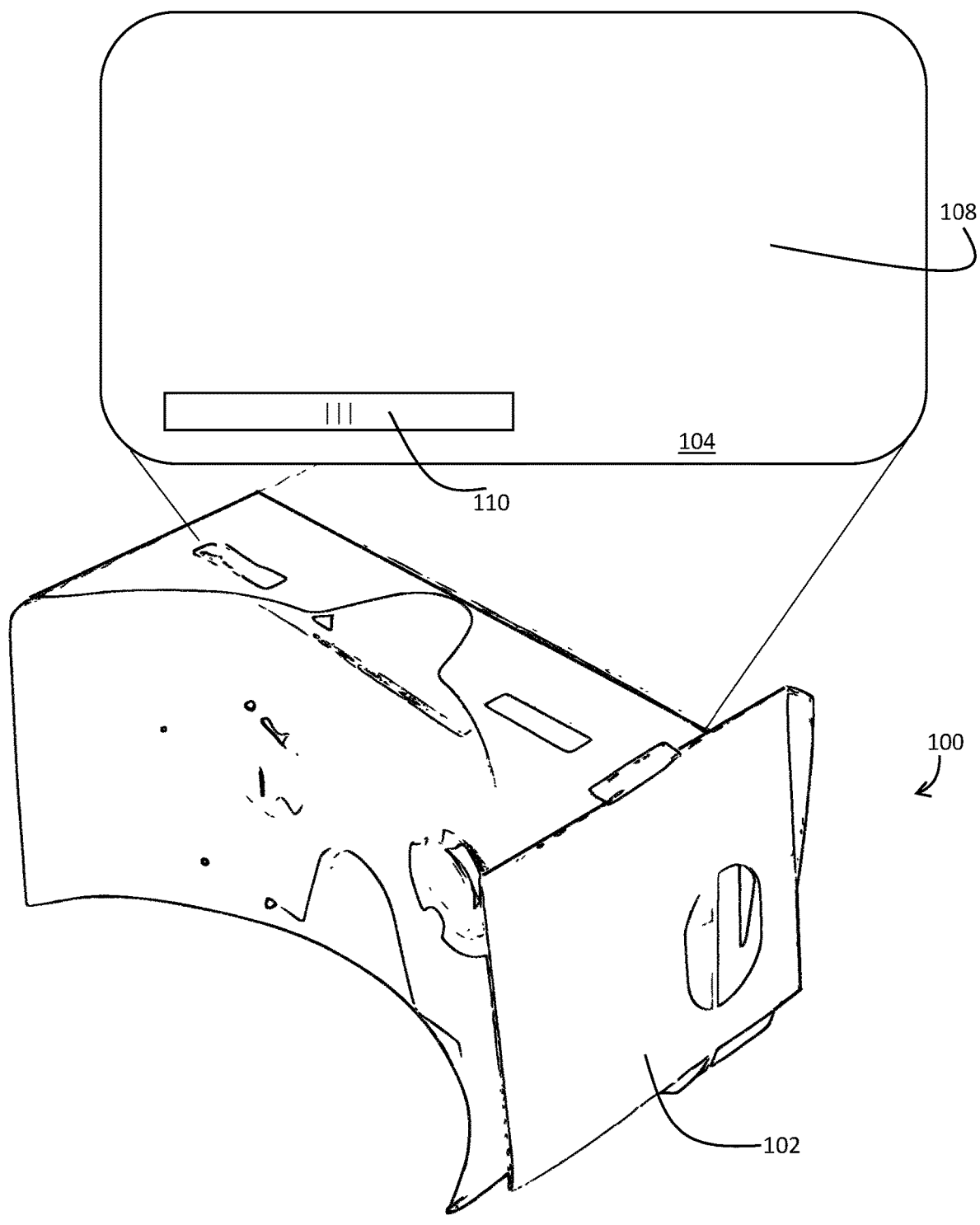
FIG. 6 depicts a user interface pursuant to one embodiment of the invention.

The user interface 100 is shown in FIG. 6, pursuant to one example. The user interface comprises a virtual reality headset 102 having attached a screen 108 thereto. In one embodiment, the screen 108 is a multi-purpose device such as a phone. The screen comprises the visible segment 108 of the presentation and an interface bar, such as a menu bar. As the visible segment 108 displays more rendered objects, the interface bar 110 displays different options.

In one embodiment, the interface 110 is not visible unless the end user requests that the interface 110 be shown. In another embodiment, the interface 110 displays a prompt to request the user to provide voice commands and also comprises and indication of whether the voice command has been understood.

As the user moves the headset 102 from right to left and up and down, the visible presentation 108 shifts accordingly. As such, either the headset 102 or the screen device 104 includes one or more motion detection devices, such as a gyroscope, GPS receiver, or another motion sensor.

Surrounding Projection

A further example of the system's output is shown in FIGS. 7A-E. As shown there, the system generates a surround or spherical projection 120. In one embodiment, the spherical projection 120 is initially dark or otherwise has a pattern displayed thereon to show the user the spherical nature of the projection 120. In one embodiment, the color of the features and the background of the sphere is optimized to match the color of the boundaries of the video 122 shown within the spherical projection.

Figure 7A:
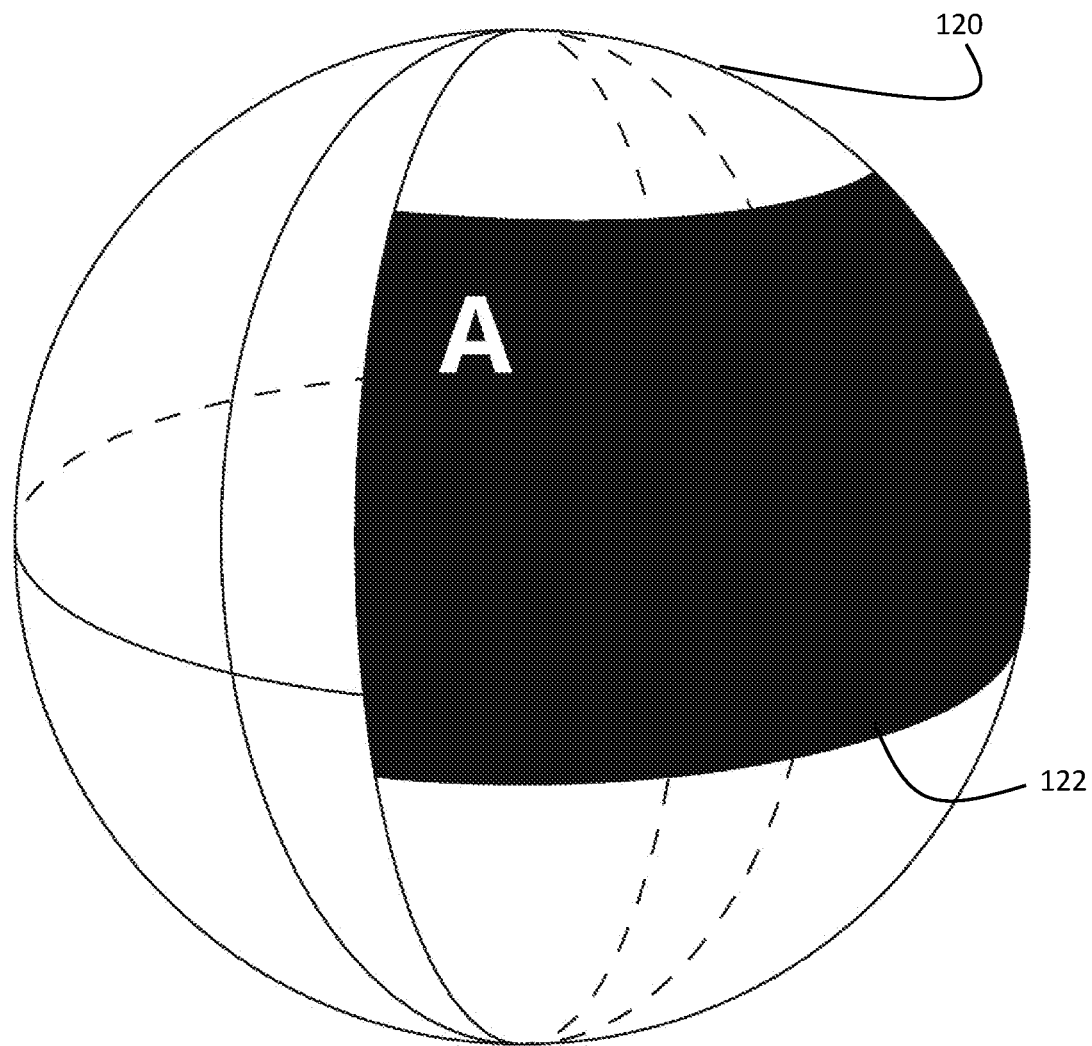
FIGS. 7A-E depict an interface pursuant to one embodiment of the invention.

The video 122 comprises a visible area, depicted with the letter "A" in FIG. 7A. The visible area of the video 122 is projected on the sphere 120 to create a three-dimensional experience for the viewer, and to allow the video 122 to follow the user's view as the user moves in various directions.

Figure 7B:
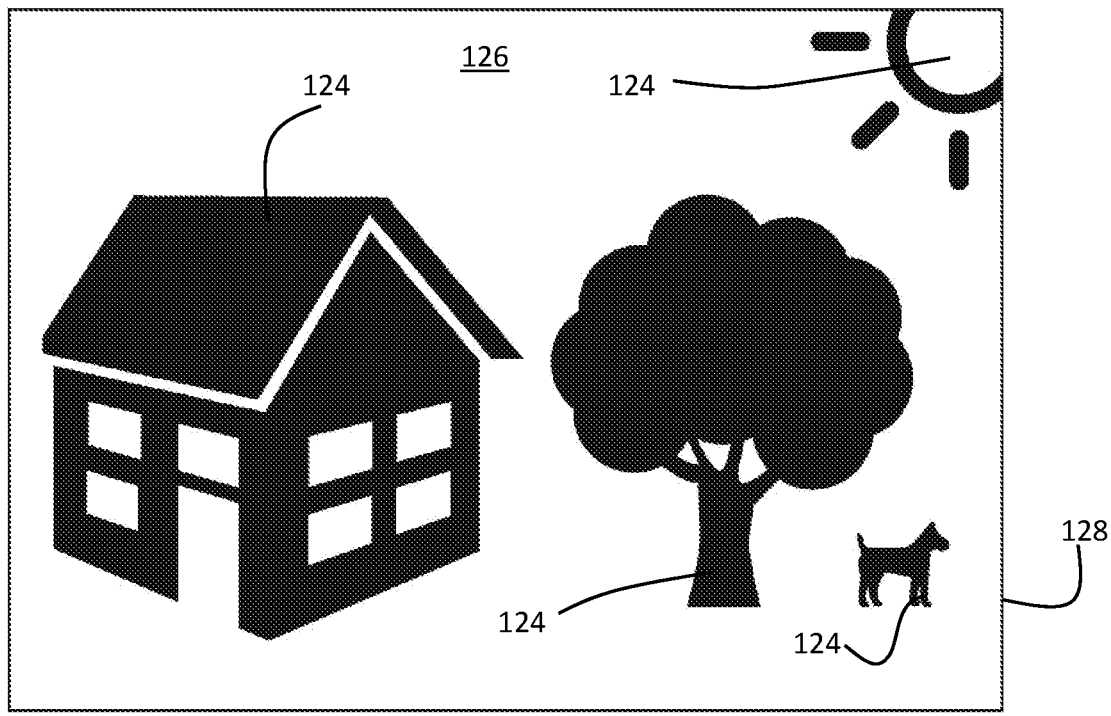

A detailed view of a frame 128 of the video 122 is shown in FIG. 7B. As depicted in the frame 128, the video 122 comprises a background 126, and one or more foreground objects 124. While as shown in the figures, the frame 128 is shown depicting line art objects on a white background, this is for clarity of the figures only. The system works with full motion video depicting real-life objects against a true background. The foreground objects 124 can include stationary objects (such as a house and a tree) or objects that are undergoing change (such as a sun that may have clouds passing over it) and finally objects that are in motion (such as a dog).

Figure 7C:
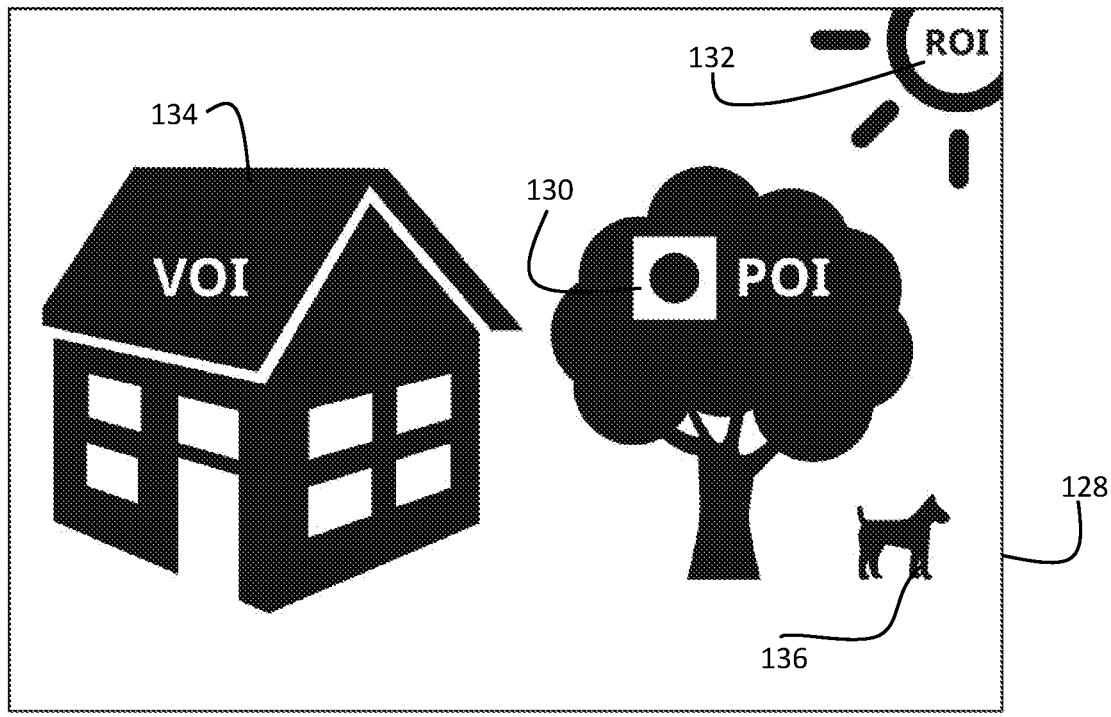

Example output of the system is further depicted in FIG. 7C. The various objects 124 shown in FIG. 7B have been converted into rendered objects or pseudo-objects in FIG. 7C. For example, the system has defined a point of interest 130 in the tree object 124. The point of interest 130 allows the user to interact with the pseudo-object, but does not have distinct boundaries and is not fully defined as a fully rendered object.

An object that is not fully visible within the frame 128 but is nonetheless of interest is also rendered by the system, however, such an object is rendered simply as a region of interest 132. Further, real-world objects that have uncertain boundaries, such as smoke, mist, or the sun, are also rendered as regions of interest 132. As the frame 128 includes information about the sun shown in the frame 128 as a region of interest, the viewer of the system can interact with it to a greater extent than a simple point of interest (such as the tree or the crown of the tree where a point of interest 130 is defined). Nonetheless, a region of interest is not rendered as a fully modeled object.

FIG. 7C also depicts an example volume of interest 134. The volume of interest 134 is the structure shown in FIG. 7C. As this is a volume of interest 134, the structure would be the most rendered and would be modeled as a fully interactive object, in one embodiment. As a volume of interest 134, information stored about the object would include all properties of the object in three dimensions, boundaries, and other details, as needed. For example, in one embodiment, the volume of interest 134 also acts as a gateway to another spherical projection of the interior of the structure (not shown).

It should be noted that not all objects 124 from FIG. 7B must be rendered. For example, some features 136 not selected by the user (or system as described above) will not have any points of interest, regions of interest, and no volume of interest associated with them. For example, in FIG. 7C, the dog was not of interest to the user, but the house, the tree, and the sun were, as in this embodiment the system was attempting to model different tree options for a property to determine sun exposure.

Figure 7D:
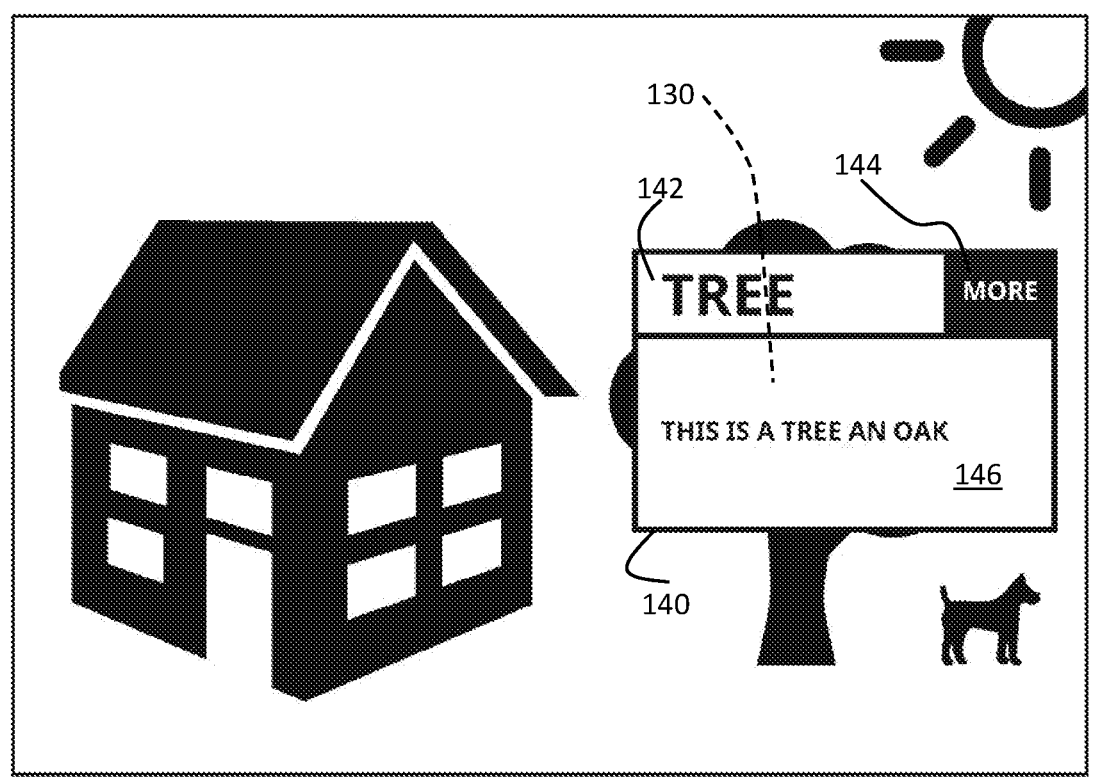

Turning now to FIG. 7D, as described above the system includes incorporation of meta-data. The metadata may be associated with fully rendered objects or pseudo objects, such as points of interest and regions of interest.

As shown in FIG. 7D, the point of interest 130 has associated with it metadata 140. As shown in the embodiment of FIG. 7D, the metadata 140 comprises a title 142, an interactive element 144, and descriptive text 146. The title 142 is offset using larger text or other formatting choices, and is set in a separate box. The meta data 140 also includes one or more interactive elements 144, such as the ability to read more information about the point of interest 130, or take an action in regards to the point of interest 130. Finally, the meta data 140 includes one or more descriptive text elements 146. In one embodiment, language of the descriptive text elements 146 varies depending on the language specified in the system. In another embodiment, the features available in the interactive element 144 and the descriptive text 146 vary depending on the identity of the user presently logged into the system.

Figure 7E:
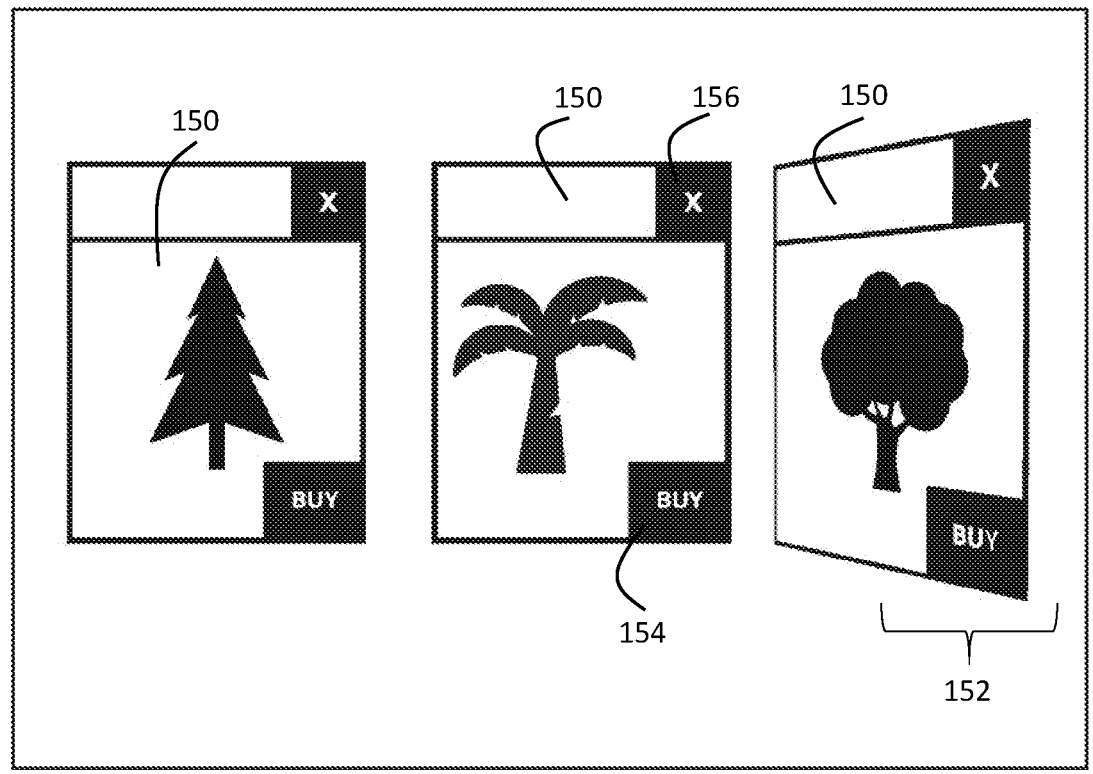

One of the actions available to the end user pursuant to the interactive element 144 is to replace the pseudo-object associated with the point of interest 130, the tree, with another object. FIG. 7E depicts this element of the user interface, where the user is select with one or more alternative objects 150. The alternative objects 150 appear as a part of the spherical projection 120, and so they curve around the edge area 152.

The alternative object selection elements 150 include one or more action area 154 such as an opportunity to insert the alternative object, for example by purchasing it. A secondary action area 156 includes a means to eliminate one or more of the alternative objects from consideration, in one embodiment.

While as shown in FIG. 7E, the alternative objects 150 are depicted against a neutral background, in one embodiment, the alternative objects 150 appear within the interface, including within the modeled environment, with all picture elements within the background.

Multi-Source Projection

Figure 8:
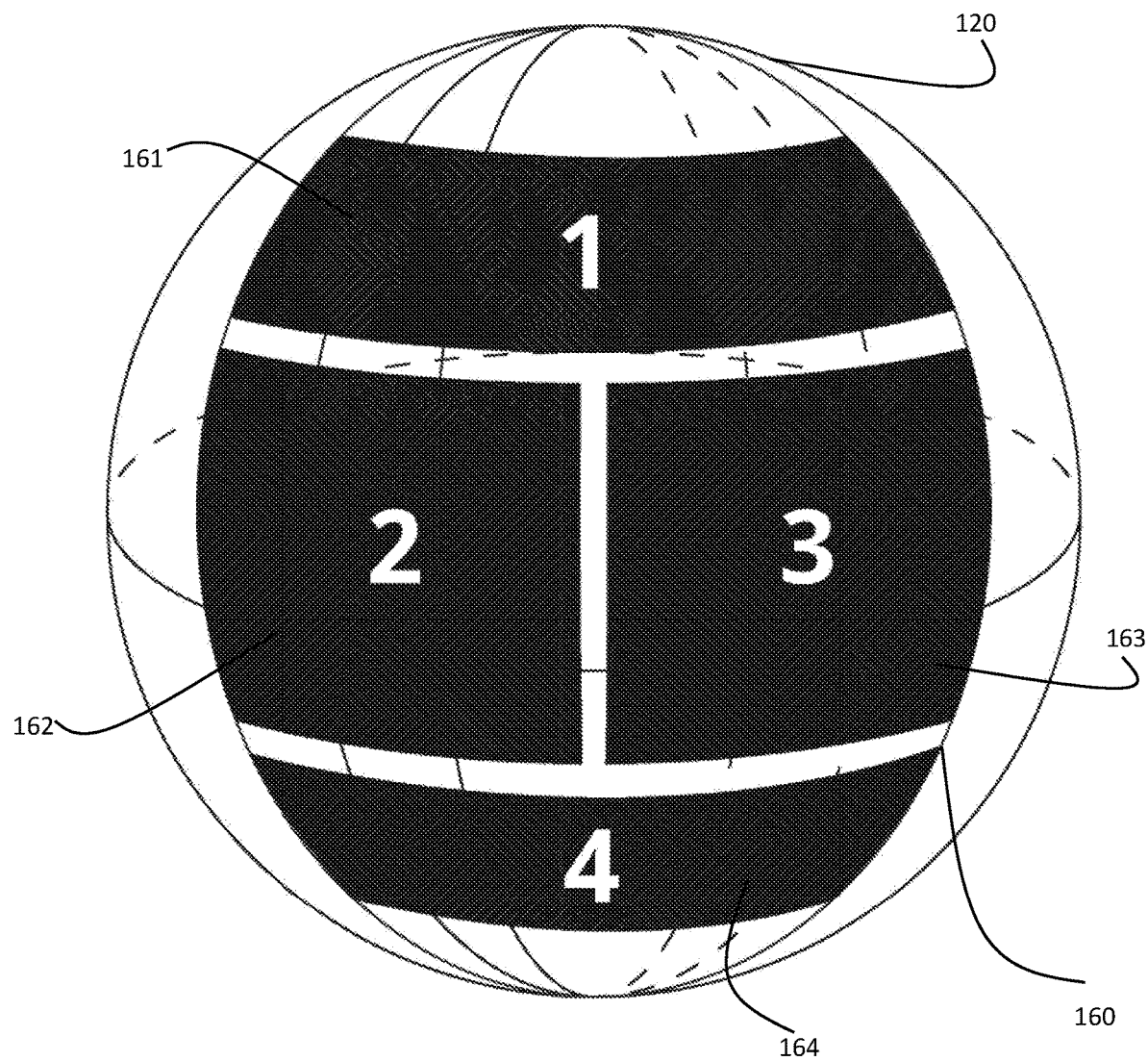
FIG. 8 depict a projection of a different embodiment of the invention.

A multisource projection upon a sphere 120 is depicted in FIG. 8. As shown in FIG. 8, the view 160 comprises four areas 161, 162, 163, 164. In one embodiment, a different camera is responsible for each of the four areas 161, 162, 163, 164. While as shown in FIG. 8, the four areas 161, 162, 163, 164 are depicted as distinct, in one embodiment, the areas overlap and the video frames are stitched together.

In one embodiment, all areas 161, 162, 163, 164 include the same granularity of information, however, in another embodiment different areas comprise different types of video inputs. For example, horizontal areas 161 and 164 may use a different camera than substantially rectangular areas 162, 163. Further, spatial data may be available for some of the areas, all, or a mixture of the two. As described above, the ability to fully model objects is in part a function of the quality and quantity of spatial data available. One of the aspects of the system is its ability to merge different source material to generate a cohesive surrounding presentation, as a view 160 in FIG. 8 depicts.

Variable Treatment

Figure 9:
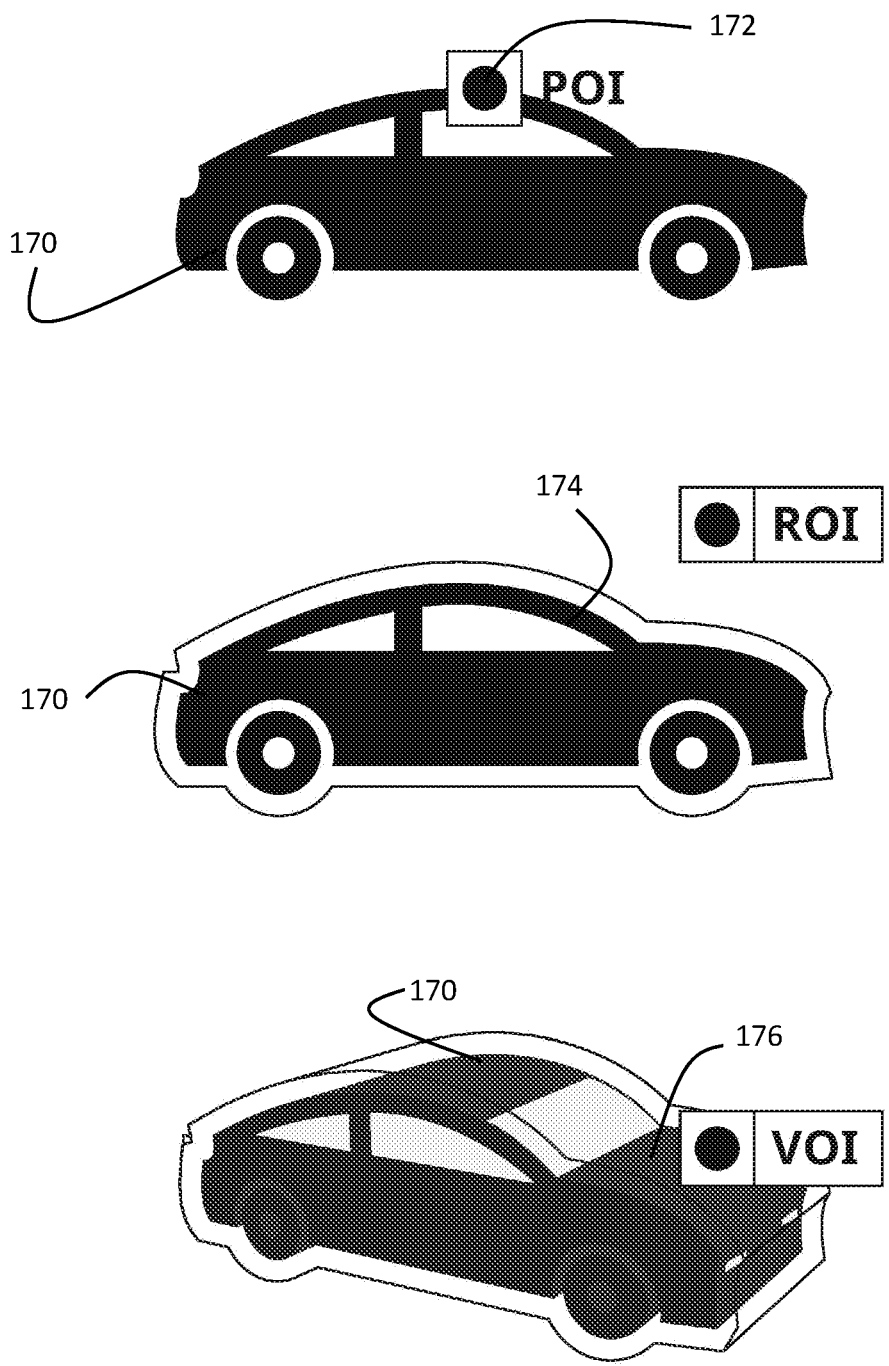
FIG. 9 depict example pseudo objects defined by one embodiment of the invention.

One of the features of the system is the ability to process real-world elements of a video with varying amount of detail, depending on the application requirements. Turning briefly to FIG. 9, the same real world object 170 found within a video (not shown) can be rendered with different amounts of detail, depending on the purpose of the presentation and the video.

In a first instance, the real world object 170 has simply a single point of interest 172 associated with the object 170. In this instance, the end user may interact with the car, but only in a limited area.

In an alternative rendering, the real world object 170 is defined as a region of interest 174. In this instance, the real world object's 170 motion within the video is more closely modeled and the real world object 170 is more interactive for the end user.

Finally, the real-world object may be rendered as a three-dimensional space or a volume of interest 176. In this instance the real world object 170 is rendered as a fully interactive three-dimensional object. In one embodiment, the user may view the volume of interest 176 from multiple angles, rotate same, and otherwise interact with it.

While as shown in FIG. 9 the amount of rendering is being performed on a per-object basis, in other embodiments, the decision as to which rendering mode is to be applied is made on components of a real-world object. For example, in the car real world object, the front windscreen defines one point of interest, the front lights are a volume of interest, in a different embodiment. In this manner, the system is flexible to allow definitions to be variable, depending on the requirements of the system, avoiding unnecessary rendering of real world objects.

In one embodiment, the system provides guidance for one or more rendering options. In this embodiment, the system suggests that a region of interest be used where the system was able to locate clear boundaries of the object. In this embodiment, edge detection algorithm is used. Similarly, a volume of interest is indicated if sufficient spatial data for the real-world object is available or may be extrapolated.

By rendering various physical objects as different detailed and interactive objects, the system presents the user a 360-degree environment with additional information. The system is a video-based augmented reality system.

Although exemplary implementations of the invention have been depicted and described in detail herein, it will be apparent to those skilled in the relevant art that various modifications, additions, substitutions, and the like can be made without departing from the spirit of the invention and these are therefore considered to be within the scope of the invention as defined in the following claims.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. While the dimensions and types of materials described herein are intended to define the parameters of the invention, they are by no means limiting, but are instead exemplary embodiments. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the terms "comprising" and "wherein." Moreover, in the following claims, the terms "first," "second," and "third," are used merely as labels, and are not intended to impose numerical requirements on their objects. Further, the limitations of the following claims are not written in means-plus-function format and are not intended to be interpreted based on 35 U.S.C. §112, sixth paragraph, unless and until such claim limitations expressly use the phrase "means for" followed by a statement of function void of further structure.

The embodiment of the invention in which an exclusive property or privilege is claimed is defined as follows:

1. A system for detecting and incorporating three-dimensional data into a video stream comprising:
    a) reading an input video data stream wherein said input video data stream comprises a video representation of at least one existing physical object in physical world;
    b) accepting from a specifying user, a specification of areas of attention wherein said areas of attention comprise hotspots defining at least one physical object already in existence in the input video stream of interest shown within the video data stream depicting the physical world, wherein said hotspot allows a viewing user to interact with said physical object; accepting from the specifying user zero or more areas to be disregarded;
    c) tracking movement within said video data stream of said hotspots thereby generating a trajectory of said at least one physical object of interest specified by the specifying user;
    d) generating a cloud of points and tracking said points to detect configurations of points most similar to said hotspots representing at least one physical object of interest;
    e) obtaining a three dimensional topology defining a volume of interest in a three-dimensional space;
    f) compiling the hotspots to an intermediate format representing at least one interactive pseudo-object; wherein said pseudo-object comprises points having extrapolated topographical information allowing for localization of each pseudo-object and tracking of motion of each pseudo-object;
    g) building virtual structures to relate said hotspots to said three dimensional topology to create a three dimensional geometric shape; and
    h) projecting in an interactive environment resulting said shape within a surrounding environment resulting in a projected video stream containing defined objects.

2. The system of claim 1 wherein said building virtual structures comprises compiling pseudo objects wherein each pseudo object is defined as a group of hotspots.

3. The system of claim 1 wherein said video data stream comprises encoded video.

4. The system of claim 1 wherein said video data stream comprises decoded video stream.

5. The system of claim 2 wherein additional information is added to said pseudo objects.

6. The system of claim 5 wherein said projection of video and pseudo objects is presented to a user.

7. A system for detecting and incorporating three-dimensional information about objects into a video stream comprising:
    a) reading an input video data stream and input three dimensional spatial data aligning the three dimensional spatial data with the input video data stream wherein said input video data stream comprises a video representation of at least one physical object in physical world;
    b) accepting from a specifying user a specification of areas of attention wherein said areas of attention comprise hotspots defining at least one physical object already in existence in the input video stream of interest shown within the video data stream, and wherein said hotspot allows a viewing user to interact with said physical object;
    extrapolating topographical information of each hotpot forming a pseudo-object;
    allowing for localization of each pseudo-object and tracking of motion of each pseudo-object; accepting from the specifying user zero or more areas to be disregarded;
    c) tracing vectors representing movements of said pseudo-objects in relation to a camera and three dimensional spatial data source;
    d) compiling the pseudo-objects to an intermediate format;
    e) building virtual structures to relate said pseudo-objects to said three dimensional information to create a three dimensional geometric shape; and
    g) projecting resulting said three dimensional geometric shape in an interactive 3d environment resulting in a projected video stream containing defined objects.

8. The system of claim 7 wherein said building virtual structures comprises compiling representations of physical objects wherein each representation of a physical object is defined as a volume or plane.

9. The system of claim 7 wherein said video data stream comprises encoded video.

10. The system of claim 7 wherein said video data stream comprises decoded video stream.

11. The system of claim 8 wherein additional information is added to said representations of physical objects.

12. The system of claim 11 wherein said projection of video and pseudo objects is presented to the viewing user.

13. The system of claim 7 wherein said building virtual structures comprises compiling representations of physical objects wherein each representation of a physical object is defined as a point of interest.

14. The system of claim 7 wherein said building virtual structures comprises compiling representations of physical objects wherein each representation of a physical object is defined as a volume of interest.

15. The system of claim 7 wherein said building virtual structures comprises compiling representations of physical objects wherein each representation of a physical object is defined as a region of interest.

16. The system of claim 1 wherein said interactive environment comprises a sphere.

17. The system of claim 7 wherein said interactive environment comprises a sphere.

18. A system for detecting and incorporating three-dimensional data into a video stream comprising:
- a) reading an input video data stream wherein said input video data stream comprises a video representation of at least one existing physical object in physical world;
- b) accepting input from a specifying user specifying areas of attention wherein said areas of attention comprise hotspots defining at least one physical object already in existence in the input video stream of interest shown within the video data stream depicting the physical world, wherein said hotspot allows a viewing user to interact with said physical object; accepting from the specifying user zero or more areas to be disregarded;
- c) tracking movement within said video data stream of said hotspots thereby generating a trajectory of said at least one physical object of interest specified by the specifying user;
- d) generating a cloud of points and tracking said points to detect configurations of points most similar to said hotspots representing at least one physical object of interest;
- e) obtaining a three dimensional topology defining a volume of interest in a three- dimensional space;
- f) compiling the hotspots to an intermediate format representing at least one interactive pseudo-object; wherein said pseudo-object comprises points having extrapolated topographical information allowing for localization of each pseudo-object and tracking of motion of each pseudo-object g) building virtual structures to relate said hotspots to said three dimensional topology to create a three dimensional geometric shape; and
- h) projecting in an interactive environment resulting said shape within a surrounding environment resulting in a projected video stream containing defined objects;
- wherein within the interactive environment, the viewing user can interact with the defined objects to retrieve metadata including video data.

19. The system of claim 18 wherein said metadata further includes hyperlinks, graphical information, video, sound, and text.

20. The system of claim 18 wherein said metadata further includes information about actions to be taken with regards to the defined objects including rotation of objects.

* * * * *